(12) United States Patent
Hertz

(10) Patent No.: US 9,914,986 B2
(45) Date of Patent: *Mar. 13, 2018

(54) METHOD FOR PRODUCING, FROM A PREFORM MADE OF AUSTENITIC STAINLESS STEEL WITH A LOW CARBON CONTENT, A WEAR-RESISTANT AND CORROSION-RESISTANT CLADDING FOR A NUCLEAR REACTOR, CORRESPONDING CLADDING AND CORRESPONDING CONTROL CLUSTER

(71) Applicant: AREVA NP, Courbevoie (FR)

(72) Inventor: Dominique Hertz, Sainte Foy Les Lyon (FR)

(73) Assignee: AREVA NP, Courbevoie (FR)

( * ) Notice: Subject to any disclaimer, the term of this patent is extended or adjusted under 35 U.S.C. 154(b) by 766 days.

This patent is subject to a terminal disclaimer.

(21) Appl. No.: 14/348,378

(22) PCT Filed: Sep. 28, 2012

(86) PCT No.: PCT/EP2012/069263
§ 371 (c)(1),
(2) Date: Mar. 28, 2014

(87) PCT Pub. No.: WO2013/045661
PCT Pub. Date: Apr. 4, 2013

(65) Prior Publication Data
US 2014/0254736 A1    Sep. 11, 2014

(30) Foreign Application Priority Data
Sep. 30, 2011 (FR) ..................... 11 58859

(51) Int. Cl.
*G21C 3/06* (2006.01)
*G21C 7/10* (2006.01)
(Continued)

(52) U.S. Cl.
CPC ............... *C21D 1/72* (2013.01); *C21D 6/004* (2013.01); *C21D 9/08* (2013.01); *C21D 9/085* (2013.01);
(Continued)

(58) Field of Classification Search
CPC . G21C 3/07; G21C 3/10; G21C 3/105; G21C 7/06; G21C 7/10; G21C 7/117;
(Continued)

(56) References Cited

U.S. PATENT DOCUMENTS 2,967,770 A * 1/1961 Hall ................. C22C 38/58
420/61
4,464,209 A    8/1984 Taira et al.
(Continued)

FOREIGN PATENT DOCUMENTS

CN    1107187 A    8/1995
EP    1193413    4/2002
(Continued)

OTHER PUBLICATIONS

"Quench hardening of steel," Total Materia, available at http://www.totalmateria.com/articles/Art12.htm, published Nov. 2000.*
(Continued)

*Primary Examiner* — Sharon M Davis
(74) *Attorney, Agent, or Firm* — Davidson, Davidson & Kappel, LLC

(57) ABSTRACT

A method for producing a wear-resistant and corrosion-resistant stainless steel part for a nuclear reactor is provided. This method includes steps of providing a tubular blank in austenitic stainless steel whose carbon content is equal to or lower than 0.03% by weight; shaping the blank; finishing the blank to form the cladding; hardening the outer surface of the cladding by diffusing one or more atomic species; the blank, before the providing step or during the shaping or (Continued)

finishing step, being subjected to at least one hyper quenching with sub-steps of: heating the blank to a sufficient temperature and for a sufficient time to solubilize any precipitates present; quenching the blank at a rate allowing the austenitic structure to be maintained in a metastable state at ambient temperature and free of precipitates.

15 Claims, 6 Drawing Sheets

(51) Int. Cl.
  *C21D 1/72*  (2006.01)
  *C21D 6/00*  (2006.01)
  *C21D 9/08*  (2006.01)
  *C21D 9/14*  (2006.01)
  *C23C 8/02*  (2006.01)
  *C23C 8/32*  (2006.01)
  *C23C 8/80*  (2006.01)
  *G21C 21/18*  (2006.01)
  *C23C 8/22*  (2006.01)
  *C23C 8/38*  (2006.01)
  *G21C 7/06*  (2006.01)
  *C21D 8/10*  (2006.01)

(52) U.S. Cl.
  CPC .................. *C21D 9/14* (2013.01); *C23C 8/02*
  (2013.01); *C23C 8/22* (2013.01); *C23C 8/32*
  (2013.01); *C23C 8/38* (2013.01); *C23C 8/80*
  (2013.01); *G21C 7/06* (2013.01); *G21C 7/10*
  (2013.01); *G21C 21/18* (2013.01); *C21D 8/10*
  (2013.01); *C21D 8/105* (2013.01); *Y02E 30/39*
  (2013.01)

(58) Field of Classification Search
  CPC ........ G21C 21/02; G21C 21/18; C21D 6/004;
  C21D 9/085; C21D 9/14

USPC ........................................................ 376/451
  See application file for complete search history.

(56) References Cited

U.S. PATENT DOCUMENTS

| | | |
|---|---|---|
| 5,503,687 A | 4/1996 | Berns |
| 2003/0094215 A1 | 5/2003 | Tanaka et al. |
| 2008/0095656 A1* | 4/2008 | Loucif .................. C22C 38/44 |
| | | 420/45 |
| 2012/0003116 A1 | 1/2012 | Osuki et al. |
| 2012/0118435 A1* | 5/2012 | Zurecki .................. C23C 8/26 |
| | | 148/232 |
| 2012/0230459 A1* | 9/2012 | Elshaik .................. C23C 8/36 |
| | | 376/305 |

FOREIGN PATENT DOCUMENTS

| | | |
|---|---|---|
| EP | 2412841 A1 | 1/2005 |
| EP | 1 715 071 A1 | 10/2006 |
| JP | A56-030680 | 3/1981 |
| JP | 59 031822 A | 2/1984 |
| JP | A59-031822 | 2/1984 |
| JP | A61-067761 | 7/1986 |
| JP | A01-104716 | 4/1989 |
| JP | H08-285975 | 11/1996 |
| JP | A09-015383 | 1/1997 |
| JP | 2001 032045 A | 2/2001 |
| JP | 2001-330038 | 11/2001 |
| JP | A2009-161802 | 7/2009 |
| WO | WO 2006/033316 | 3/2006 |
| WO | WO 2010/110003 A1 | 9/2010 |

OTHER PUBLICATIONS

J. Olfe et al., Verschleiûschutz and Korrosionsbesta Èndigkeit von austenitischem Stahl durch Plasmadiffusionsbehandlung, (2000), pp. 253-258 (See Computer Translation also).

* cited by examiner ically applies to the manufacture of
METHOD FOR PRODUCING, FROM A PREFORM MADE OF AUSTENITIC STAINLESS STEEL WITH A LOW CARBON CONTENT, A WEAR-RESISTANT AND CORROSION-RESISTANT CLADDING FOR A NUCLEAR REACTOR, CORRESPONDING CLADDING AND CORRESPONDING CONTROL CLUSTER The present invention concerns the manufacture of parts in stainless steel whose resistance to wear and corrosion is improved via a hardening treatment by diffusion of one or more atomic species.

BACKGROUND

The invention particularly applies to the manufacture of neutron-absorbing rods intended to be used in light water reactors (LWRs), and notably in Pressurized Water Reactors (PWRs).

Neutron-absorbing rods are usually grouped into control clusters. Among these clusters some are frequently moved within and rub against guides when in operation. These clusters also vibrate under the effect of the flow of water. The rods contained therein therefore risk becoming worn and losing part of their neutron-absorbing capacity, the very essence of reactor safety. The claddings and end plugs of the neutron absorbing rods are particularly exposed to this risk of wear.

The frequency and amplitude of the movements of some of these absorber rods, in particular when the reactor is used in load-following mode, the frequency and amplitude of the vibrations of some of the absorber rods, in particular for clusters remaining in stationary position, are such that is necessary frequently to control and ensure early replacement of a certain number of clusters having regard to the wear arising from friction.

To combat this wear, it has been proposed to harden the outer surface of the claddings by nitriding. Documents FR-2 604 188, EP-446 083, EP-537 062 and EP-801 142 describe plasma nitriding steps.

Such nitriding steps provide efficient protection against the wear of the claddings of the absorber rods.

SUMMARY OF THE INVENTION

However, it has been found that some surfaces thus nitrided have insufficient corrosion resistance and there could be onset of rust after manufacture during transport, during storage or when placing the control clusters in service.

It is one of the objectives of the invention to overcome this disadvantage by proposing a method allowing the manufacture of parts having good resistance to wear and good corrosion resistance.

For this purpose, the invention concerns a method for producing a wear-resistant and corrosion-resistant cladding in stainless steel for nuclear reactor, the said method comprising steps of:
 providing a tubular blank in austenitic stainless steel having a carbon content equal to or lower than 0.03% by weight;
 shaping the blank;
 finishing the blank to form the cladding;
 hardening the outer surface of the cladding by diffusion of one or more atomic species.

the blank being subjected, before the providing step or during the shaping or finishing step, to at least one hyper quenching with sub-steps of:
 heating the blank to a sufficient temperature and for a sufficient time to solubilise any precipitates present;
 quenching the blank at a rate allowing the austenitic structure to be maintained in metastable state at ambient temperature and free of precipitates.

According to other optional characteristics of the method:
 the heating sub-step is conducted at a temperature of between 1020° C. and 1100° C., preferably between 1040 and 1080° C.;
 the heating sub-step is conducted for a time of between 1 minute 30 seconds and 30 minutes, preferably between 3 and 10 minutes;
 during the quench sub-step, the blank is cooled from the quench start temperature down to lower than 850° C. in less than 3 minutes and down to lower than 450° C. in less than one hour;
 the said hyper quenching is not followed during the shaping step or during the finishing step by an operation creating surface tensile stresses;
 the said hyper quenching is not followed during the shaping step or during the finishing step by grinding, brushing, polishing or buffing;
 the finishing step comprises at least one stripping or tribo-finishing of the outer surface of the cladding;
 the hardening step of the outer surface of the part comprises plasma nitriding;
 the hardening step of the outer surface of the cladding comprises carbonitriding or nitrocarburizing;
 the hardening step comprises carburizing or case hardening; and
 the blank has no weld.

The invention also concerns a cladding obtained following a method such as described above.

The invention also concerns a control cluster for pressurized water nuclear reactor comprising a spider assembly, absorber rods carried by the spider assembly the absorber rods having claddings containing at least one neutron-absorbing material, and cladding end plugs, characterized in that the claddings of at least some of the absorber rods are claddings such as defined above.

BRIEF SUMMARY OF THE DRAWINGS

Other aspects and advantages of the invention will become apparent on reading the following description given solely as an example and with reference to the appended drawings in which.

DETAILED DESCRIPTION

Figure 1:
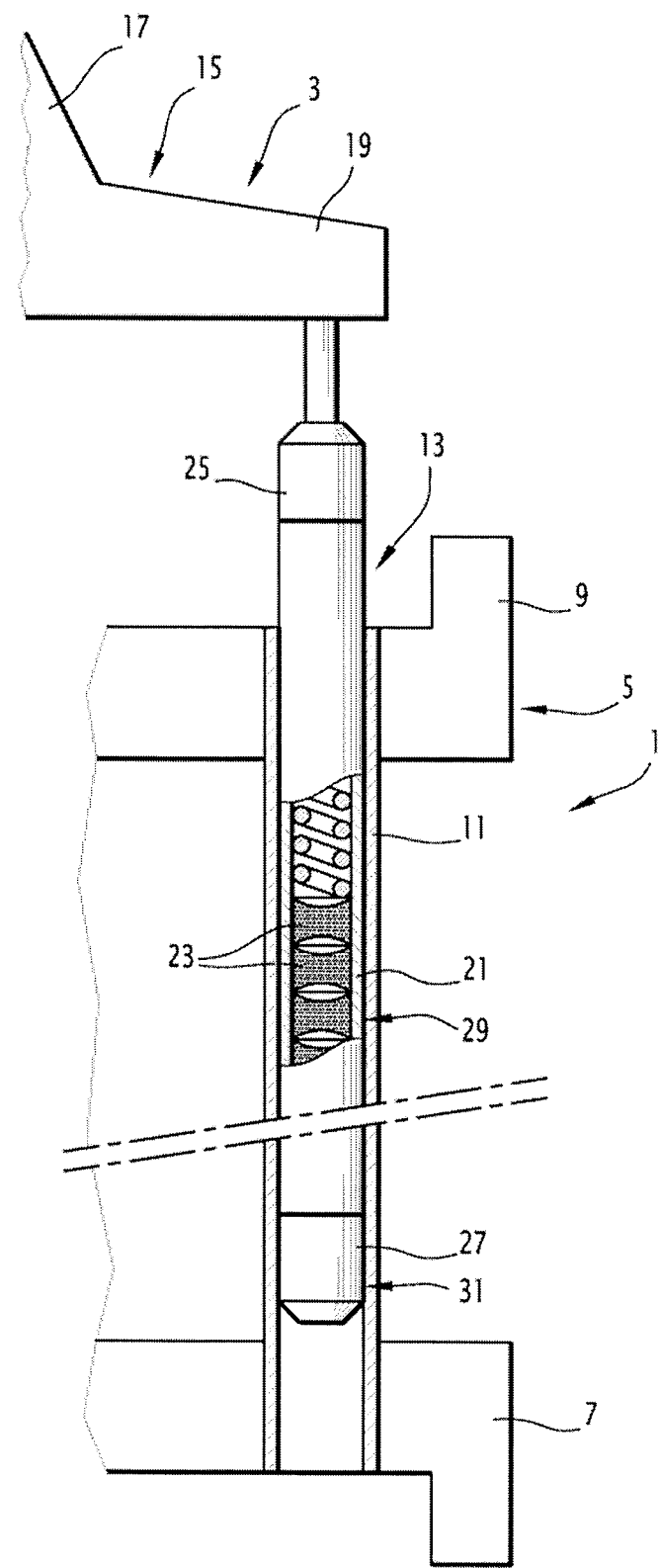
FIG. 1 is a partial cross-sectional schematic illustrating an absorber rod of a control cluster according to an embodiment of the invention.

In FIG. 1 part of a nuclear fuel assembly 1 can be seen and part of a control cluster 3 controlling the reactivity of the core of a nuclear reactor in which the assembly 1 is loaded.

As is conventional, the assembly 1 comprises a bundle of nuclear fuel rods (not illustrated) and a skeleton holding and supporting this bundle. The skeleton 5 comprises a lower end-piece 7, an upper end-piece 9 and guide tubes 11 which connect the lower end-piece 7 and upper end-piece 9. A single guide tube 11 is illustrated in FIG. 1.

The control cluster 3 comprises neutron absorbing rods 13 of which only one can be seen in FIG. 1 and a spider structure 15 supporting and holding the absorber rods 13 in place so that they lie parallel to one another and are positioned laterally along the same grid array as the guide tubes 11 of the assembly 1 surmounted by the control cluster 3.

The spider structure 15 comprises a connector part 17 to connect the control cluster 3 to a moving mechanism (not illustrated) and wings 19 joined to the connector part 17 on each of which are secured one or more absorber rods 13.

The rod 13 illustrated in FIG. 1 comprises a cladding 21 containing at least one neutron-absorbing material e.g. in the form of a stack of pellets 23 in boron carbide $B_4C$. The cladding 21 is a tube e.g. 3.8 m in length with outer diameter of 9.70 mm and thickness of 0.5 mm. The cladding 21 is closed by an upper end plug 25 and a lower end plug 27. The bottom part of the lower end plug 27 converges downward for example.

As is conventional, to regulate the reactivity of the reactor, the control cluster 3 is inserted in or extracted from the core of the reactor so that the absorber rods 13 are moved inside the corresponding guide tubes 11 and along the guides (not illustrated) located in the upper inner elements of the reactor.

The cladding 21 is made of austenitic steel for example of AISI 304 or AISI 316 type, generally low carbon AISI 304L or AISI 316L. The end plug 27 is in AISI 308 austenitic steel for example, in general low carbon AISI 308L. The compositions (in weight % after casting) of these steels are given in Table 1:

TABLE 1

| Element | AISI 316L Standard DIN 1.4311 | | AISI 304L Standard DIN 1.4311 | | AISI 308L Standard DIN 1.4303 | |
|---|---|---|---|---|---|---|
| | Minimum | Maximum | Minimum | Maximum | Minimum | Maximum |
| Carbon | | 0.03 | | 0.03 | | 0.03 |
| Manganese | | 2.00 | | 2.00 | — | 2.00 |
| Phosphorus | | 0.05 | | 0.05 | | 0.05 |
| Sulphur | | 0.03 | | 0.03 | | 0.03 |
| Silicon | | 1.00 | | 1.00 | | 1.00 |
| Cobalt | | 0.04 | | 0.04 | | 0.12 |
| Nickel | 10.00 | 14.00 | 8.50 | 11.50 | 10.00 | 12.00 |
| Chromium | 16.50 | 18.50 | 17.00 | 19.00 | 19.00 | 21.00 |
| Molybdenum | 2.00 | 2.50 | | | | | the remainder being iron and production impurities.

More generally the cladding 21 is made in austenitic stainless steel whose carbon content is preferably 0.03 weight % or lower. It can also be made in other types of stainless steel, preferably low carbon.

Also preferably the cladding 21 is made from a tubular blank having no weld. It can also be made from a rolled-welded blank for example if heat treatments have allowed the re-solubilising of precipitates, chromium and molybdenum carbides and nitrides in particular, this being the case with the hyper quenching treatment described below.

The cladding 21 is obtained for example using a manufacturing method comprising the following steps:

providing a tubular blank in austenitic stainless steel optionally subjected to hyper quenching treatment i.e. in the meaning of the present description a treatment comprising:

heating the tubular blank to a sufficient temperature and for a sufficient time to solubilise the precipitates, in particular chromium and molybdenum carbides and nitrides; then quenching the tubular blank at a rate allowing the subsequent maintaining of the austenitic structure in the metastable state and free of precipitates at ambient temperature;

shaping the blank, this step comprising sub-steps of:

if the tubular blank has not undergone hyper quenching, performing such hyper quenching;

conducting one or more cold drawing or rolling cycles each followed by hyper quenching;

final drawing;

finishing, this finishing step possibly comprising sub-steps of:

truing polishing on abrasive strips and wheel quality control and/or, stripping/passivation.

With regard to the hyper quenching operations described above, heating is preferably ensured at a temperature strictly higher than 1020° C., preferably higher than 1040° C., preferably lower than 1100° C., and further preferably lower than 1080° C.

The heating time for example is between 1 minute 30 seconds for a blank of narrow thickness (of the order of 1 mm) and 30 minutes for a blank of larger thickness (of the order of 1 cm) and preferably between 3 and 10 minutes. The heating time, for the last heat treatments in particular, must not be too long to limit grain growth, such growth possibly being detrimental to the properties of the end component.

Quenching is preferably ensured to prevent the maintaining of the steel at a temperature of 450 to 800° C., the precipitation range of chromium nitrides and carbides. If the furnace load is low e.g. a few blanks not bundled together, gas quenching preferably with neutral or non-oxidizing gas is sufficient to ensure cooling without precipitation. The critical quench rate is dependent on the carbon content of the steel; it is faster the higher the carbon content. Therefore, for a weight content of 0.03% carbon, the temperature will drop during quenching from the quench start temperature down to a temperature below 850° C. preferably in less than 3 minutes and from the quench start temperature down to a temperature below 450° C. preferably in less than a quarter of an hour for a blank of narrow thickness (of the order of 1 mm) and in less than one hour for a blank of greater thickness (of the order of 1 cm)

Table 2 gives two examples of the sequencing of shaping and finishing steps of a weld-free tubular blank in austenitic stainless steel to produce a cladding 21. After these different operations the cladding 21 obtained, after welding onto the lower end plug 27, will be subjected to hardening of its outer surface 29 by diffusion of one or more atomic species. This hardening treatment is described further on.

TABLE 2

| Operation | Conditions | |
|---|---|---|
| | Example 1 | Example 2 |
| Providing blanks in austenitic stainless steel | Outer diameter of 21.30 mm, thickness of 1.60 mm | Outer diameter of 16 mm, thickness of 1 mm |
| Cold rolling | Rolling to an outer diameter of 12.7 mm and inner diameter of 11.40 mm | / |
| Solution annealing | Heating to 1050 ± 50° C. in $H_2$ for 1 min 30 s to 5 min, Quenching to cool down from 900 to 450° C. in less than 5 min | / |
| Cold drawing | Drawing to an outer diameter of 10.57 mm and inner diameter of 9.60 mm | Drawing to an outer diameter of 13.35 mm and inner diameter of 12 mm |
| Solution annealing | Heating to 1050 ± 50° C. in $H_2$ for 1 min 30 s to 5 min, Quenching to cool down from 900 to 450° C. in less than 5 min | Heating to 1060 ± 50° C. in $H_2$ for 1 min 30 s to 5 min, Quenching to cool down from 900 to 450° C. in less than 5 min |
| Cold drawing | Drawing to an outer diameter of 9.65 mm and inner diameter of 8.75 mm | Drawing to an outer diameter of 11.35 mm and inner diameter of 10.45 mm |
| Solution annealing | / | Heating to 1060 ± 50° C. in $H_2$ for 1 min 30 s to 5 min, Quenching to cool down from 900 to 450° C. in less than 5 min |
| Cold drawing | / | Drawing to an outer diameter of 9.7 mm and inner diameter of 8.70 mm |
| Trueing | Yes | Yes |
| Polishing | Yes | Yes |
| Quality control | Yes | Yes |
| Cutting to length | Yes | Yes |
| Stripping - passivation | / | Yes |
| Final polishing | Yes | Yes |

The lower end plug 27 can be produced using a method comprising the following steps for example:
 providing a cylindrical blank in austenitic stainless steel obtained by hot rolling;
 hyper quenching with heating to a temperature adapted to the bulk of the part, generally of between 1050 and 1150° C., preferably between 1070 and 1130° C.;
 re-truing;
 centreless grinding;
 shaping by machining;
 finishing.

The lower end plug 27 is fitted over the end of the corresponding cladding 21 and welded using TIG welding for example (Tungsten Inert Gas) in a protective atmosphere to prevent oxidation.

The cladding 21 and its lower end plug 27 are then subjected to a hardening step of their respective outer surfaces 29 and 31 by diffusion of one or more atomic species.

This may be a nitriding step such as described in documents FR-2 604 188, EP-446 083, EP-537 062 and EP-801 142.

Preferably, it is a carbonitriding step or nitrocarburizing step such as described for example in document EP-801 142.

It is possible for example to subject the cladding 21 and its lower end plug 27 to a plasma-activated gas atmosphere containing nitrogen, hydrogen and a hydrocarbon, at a treatment temperature of between 340 and 450° C. and preferably between 400 and 420° C.

The layers of the cladding 21 and end plug 27 close to their respective outer surfaces 29 and 31 become diffused with carbon and nitrogen so that in the steel of these surface layers whose thickness may be between 10 and 60 μm there is formed a solid solution of carbon and nitrogen.

More generally other hardening steps of the outer surfaces 29 and 31, by diffusion of atomic species, other than those described above can be used: gas nitriding, ion case hardening . . . .

The surface layers thus formed on the claddings 21 and end plugs 27 provide increased resistance to wear.

The Applicant has also ascertained that the claddings 21 and lower end plugs 27 obtained with the methods described above, after the hardening, step exhibit good corrosion resistance and in particular better corrosion resistance than that of claddings and end plugs obtained using prior art methods.

Through the use of one or more hyper quenching operations such as described above the de-mixing of the nitrogen-containing austenite of the surface layer, into chromium nitride and a metal phase depleted of chromium, during the nitriding step is reduced.

Said demixing can be translated by the formula:

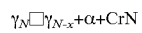

where $\gamma_N$ represents the nitrogen-containing austenite
 $\gamma_{N-x}$ represents the austenite containing less nitrogen
 α represents ferrite and CrN chromium nitride.

The risks of corrosion of the outer surfaces 29 of the claddings 21 and the outer surfaces 31 of the lower end plugs 27 in the course of their use are therefore reduced.

In addition, if the carbon content is low it is possible to reduce the presence of carbide seeds which could lead to the formation of carbonitrides during the nitriding step and could also cause demixing of the austenite in the surface layer. This characteristic therefore also contributes towards reducing the sensitivity to corrosion.

The hyper quenching operation(s) can be performed before providing the blank and/or during the shaping or finishing step.

Also, as set forth below, if the tubular blanks are weld-free this also allows reduced sensitivity to corrosion of the claddings 21.

Figure 2:
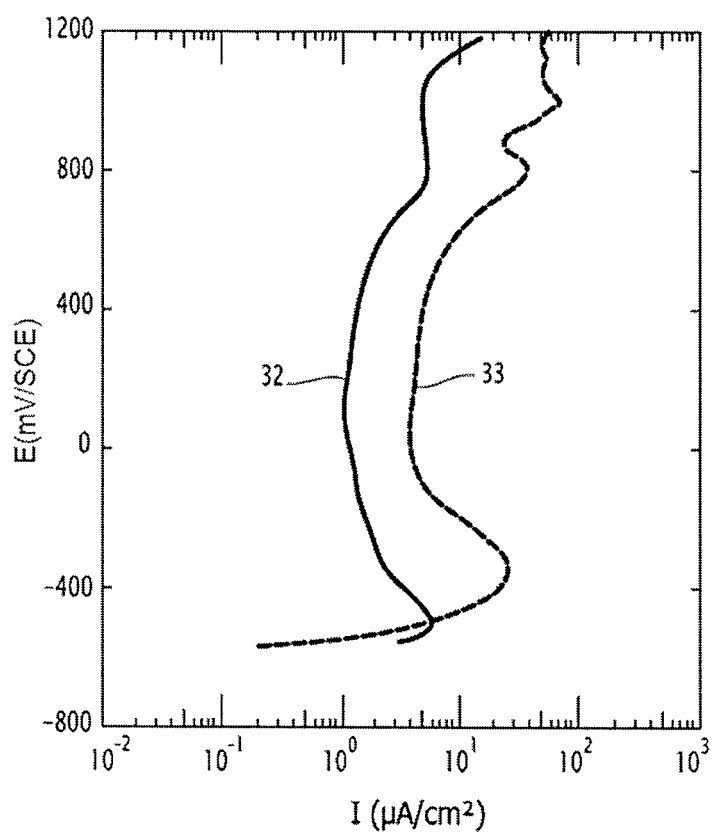
FIG. 2 gives the intensity/potential curves for claddings in AISI 316L before and after nitriding.

FIG. 2 gives the intensity/potential curves, or polarisation curves, in de-aerated boric acid solution (2000 ppm of B in $H_3BO_3$ form and 1000 ppm of $SO_4^{2-}$), at 70° C., for claddings 21 in AISI 316L obtained as described previously before nitriding (curve 32) and after nitriding (curve 33).

The corrosion current is given along the X-axis and is expressed in $\mu A/cm^2$ and the potential along the Y-axis in mV relative to a saturated calomel electrode (mV/SCE). As can be seen, the sensitivity to corrosion of the claddings 21 is low before nitriding whereas it can be 8 times higher for nitrided claddings 21.

When considering the activity peak of non-nitrided austenitic stainless steels it is possible to follow the trend of the corrosion current during a potentiostatic test and the trend in current quantity, this current quantity being related to the quantity of corrodible material as per Faraday's law.

Having regard to the composition of the steels used (AISI 304L and AISI 316L) and the respective valences of the corrodible iron and nickel elements, when considering the activity peak (−490 mV/SCE for these steels), 2.4 to 2.7 $C/cm^2$ correspond to a corrodible thickness of about 1 μm.

Figure 3:
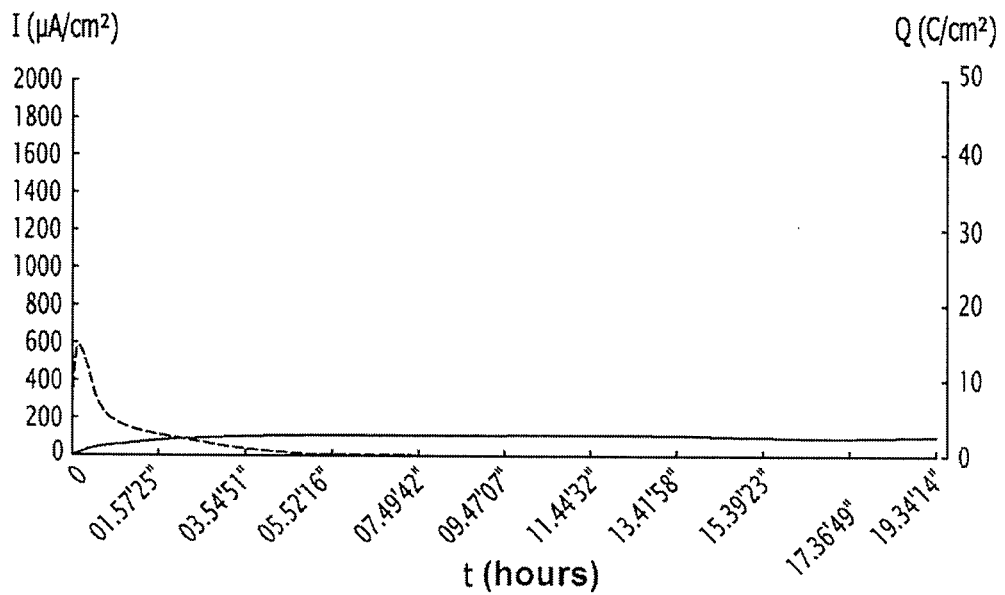
FIGS. 3 to 5 show curves derived from potentiostatic tests performed on nitrided claddings, FIGS. 3 to 5 corresponding to different compositions of austenitic steels and different nitriding conditions.
Figure 4:
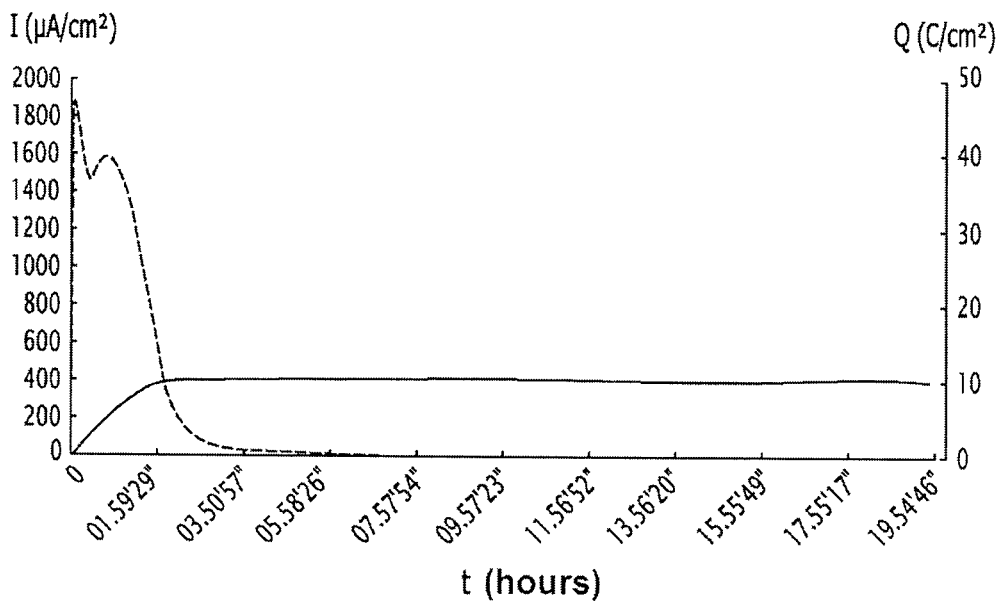
Figure 5:
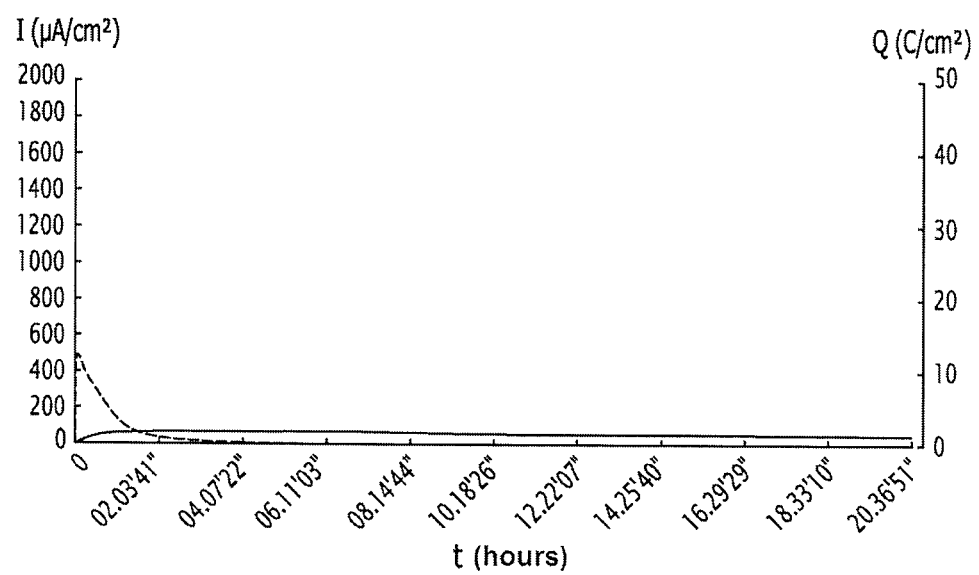

FIGS. 3 to 5 allow a comparison between the results of potentiostatic tests on different nitrided claddings including one nitrided at too high a temperature. In these Figures, the dotted curve represents the corrosion current I in $\mu A/cm^2$ and the solid line curve the quantity of corrosion current Q in $C/cm^2$.

For each of these three tests the activity peak is considered (−490 mV/SCE) in a de-aerated boric acid solution (2000 ppm of B in $H_3BO_3$ form and 1000 ppm of $SO_4^{2-}$) at 70° C.

FIGS. 3 and 4 respectively illustrate claddings 21 made in AISI 304L steel. These two claddings differ in that the one in FIG. 4 was nitrided at too high a temperature. FIG. 5 concerns a cladding 21 obtained from AISI 316L steel and suitably nitrided. The measured quantities of corrosion current Q are respectively 2.37 $C/cm^2$, 10.03 $Cm^2$ and 1.53 $C/cm^2$, bearing in mind that the quantity of corrosion current of a non-nitrided austenitic stainless steel is 0.00 $C/cm^2$.

The results of these potentiostatic tests tally well with the micrographs: the sensitivity to corrosion of a nitrided layer signalled by a strong current is also revealed by the visible attack seen in metallographic cross-sections.

One acceptance criterion for sensitivity to corrosion can therefore be proposed on the basis of the quantity of corrosion current Q measured during potentiostatic tests. The value chosen is 3 $C/cm^2$, the measured Q values having to be lower for the analysed part to have satisfactory corrosion resistance.

According to the curves in FIGS. 3 and 5, the corrosion sensitivity of the claddings 21 in AISI 304L and AISI 316L after nitriding is therefore less than 3 $C/cm^2$.

However it has been found that some end plugs 27 in AISI 308L, which were not obtained following a method described above and which had been welded to the bottom of these claddings 21 and had been nitrided at the same time, could exhibit greater corrosion sensitivity (up to 12 $C/cm^2$) despite a chromium content and hence theoretically greater non-oxidizability.

Figure 6:
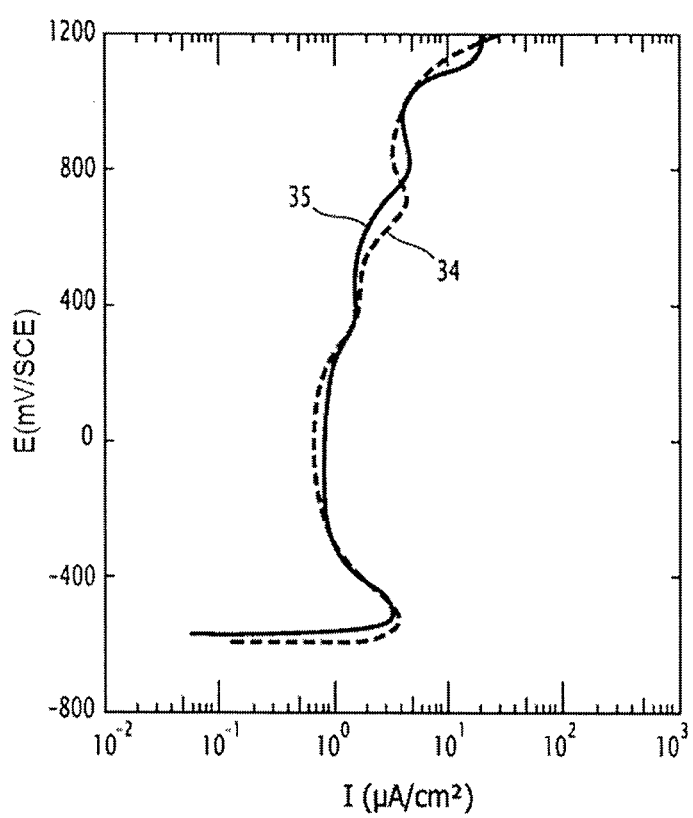
FIG. 6 gives intensity/potential curves for claddings derived from welded and non-welded blanks before nitriding.

FIG. 6 gives the intensity/potential curves in the aforementioned boric acid solution for a cladding 21 in AISI 316 obtained from a blank containing 0.046% carbon by weight, with welding (curve 34), and a cladding 21 in AISI 316L obtained from a blank containing 0.02% carbon by weight having no weld (curve 35).

As can be seen, before nitriding the sensitivity to corrosion of the claddings 21 is similar whether they are obtained from blanks with or without a weld, despite the different carbon content of the steels.

Figure 7:
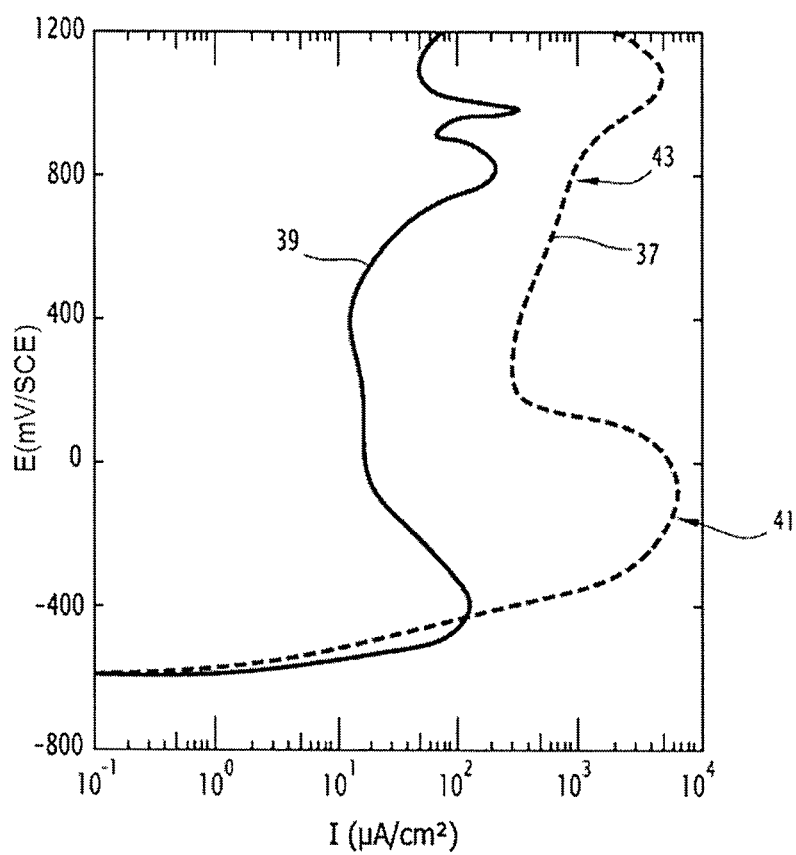
FIG. 7 is a similar view to FIG. 6 for claddings derived from welded and non-welded blanks after nitriding.

FIG. 7 allows a comparison between the intensity/potential curves after nitriding under the same conditions for the same claddings 21 derived from blanks with welding (curve 37) and without welding (curve 39).

As can be seen, the current intensity is about 50 times greater at the corrosion peak 41 and about 25 times greater at the passivation plateau 43 for curve 37 relative to curve 39.

Therefore the use of claddings 21 made from tubular blanks having no weld and with low carbon content allows a significant reduction in sensitivity to corrosion after nitriding of the claddings 21.

One possible explanation is that the lack of control over temperature during heating and cooling when welding blanks causes sensitization not only of the welded region and the heat affected region, but also of the entire blank if it is a tubular blank. This sensitization could become apparent during subsequent nitriding through demixing of the austenite.

Table 3 below allows a comparison between sensitivity to corrosion after nitriding claddings 21 obtained from welded and non-welded blanks, with (case 1, 3 and 4) or without (case 2) hyper quenching such as described above before nitriding, this hyper quenching allowing the re-solubilising of precipitates and the removal of residual stresses resulting from shaping.

TABLE 3

| Case | Welded blank | Heating time and temperature for solution annealing | C content in weight % | Sensitivity to corrosion after nitriding Q in $C/cm^2$ |
|---|---|---|---|---|
| 1 | No | 3 mn at 1040° C. | 0.02 | 2.9 |
| 2 | Yes | 2 to 4 mn at 996° C. | 0.046 | >35 |
| 3 | Yes | 2 to 4 mn at 996° C. then 3 mn at 1040° C. | 0.046 | ~11 |
| 4 | yes | 2 to 4 mn at 996° C. then 20 mn at 1080° C. | 0.046 | 5.2 |

It is therefore ascertained first that the use of non-welded blanks with low carbon content and secondly the use of high hyper quenching enabling the removal of precipitates allow corrosion sensitivity to be reduced significantly and independently.

Even after high hyper quenching, the sensitivity to corrosion remains affected however by a relatively high carbon content (case 2 and 3).

While the use of non-welded tubular blanks is preferred, it is also possible to use rolled-welded blanks provided that after welding they are subjected to high hyper quenching treatment such as described above, which will allow the re-solubilising of precipitates.

More generally, it was surprisingly ascertained that the finishing treatments, after the final drawing step for shaping, such as grinding, brushing, polishing or buffing operations could have an impact on the corrosion resistance of the nitrided claddings 21.

Table 4 below compares the sensitivity to corrosion of nitrided claddings 21 having different surface conditions obtained with or without polishing or buffing operations before the nitriding step and after the shaping step. Hardness and roughness were measured on the outer surfaces 29 of the claddings 21 after nitriding.

TABLE 4

|  | Case 1 | Case 2 | Case 3 |
|---|---|---|---|
| Polishing | Yes | No | No |
| Buffing | Yes | Yes | No |
| Arithmetic roughness Ra | 0.19-0.21 | 0.31-0.64 | 0.29-0.44 |
| Hardness HV50 | 1038 | 1038 | 1107 |
| Hardness HV100 | 1097 | 1048 | 1105 |
| Thickness in µm (of the hardened layers) | 18 | 17.8 | 17.3 |
| Q in C/cm$^2$ | 1.65 | 1.04 | 0.5 |

The surface work hardness imparted by mechanical finishing treatments therefore increases sensitivity to corrosion after nitriding (loss of at least 0.5 C/m$^2$ both with polishing and buffing).

Therefore preferable use is made of parts which have not been subjected to such mechanical finishing steps before the hardening step to form claddings 21, end plugs 27 and more generally any other part which can be used in a nuclear reactor and which must have good resistance to wear and corrosion.

The presence of such mechanical finishing steps can account for the corrosion sensitivity found on some lower end plugs 27 during the potentiostatic tests in FIGS. 3 to 5.

With regard to the end plugs 27 and more generally any other machined part able to be used in a nuclear reactor and having to show good resistance to wear and corrosion, such as guide pins, nuts and screws, . . . it is not always possible to perform the machining operation so as to prevent the formation of a work hardened surface layer which at a subsequent hardening operation will lead to degradation of sensitivity to corrosion.

Table 5 below gives the work hardening depths for different modes of surface preparation (according to L. E. Samuels and G. G Wallwork, J. Iron Steel Inst. 186 (1957) 211).

TABLE 5

| Mechanical treatment |  | Thickness of deformed metal layers (in µm) |
|---|---|---|
| Paper polishing SiCN° | 220 | 6 |
|  | 400 | 2.5 |
|  | 600 | 2.2 |
| Emery paper polishing | 1/0 | 5 |
|  | 2/0 | 4 |
|  | 3/0 | 4 |
|  | 4/0 | 4 |
| Alumina abrasive paste |  | 1.5 |
| Milling |  | 45 |
| Wheel grinding |  | 35 |

Nonetheless, treatments conducted after the shaping step and before the nitriding step of parts allow this degradation to be prevented by removing work hardness of the surface layers. Four examples, of such treatments are given below.

These treatments can optionally be combined.

A first treatment comprises hyper quenching under the conditions defined above. This hyper quenching allows the re-solubilising of carbides and nitrides resulting from machining for example, and of martensitic phase microprecipitates which are as many seeds for demixing of the austenite during nitriding. Hyper quenching also allows the removal of surface mechanical stresses which promote this demixing of austenite during the hardening step. This treatment is not applicable however if it is desired to maintain work hardness in the bulk of the parts, guaranteeing greater mechanical properties but this is not the case in the example of the end plugs 27.

A second treatment comprises chemical stripping using nitric or fluonitric acid, aqua regia . . . . Stripping may also be electrochemical using an acid bath, paste or gel for 15 to 120 minutes, or electro-chemically aided for faster stripping. With stripping it is possible for example to dissolve the surface layers depleted of metal chromium over 0.5 to 5 µm. Therefore sensitivity to corrosion during the hardening step can be limited and even eliminated. This treatment remains compatible with maintained mechanical properties provided by work hardening in the bulk.

A third treatment comprises stripping with radio-frequency plasma for 2 to 4 h at 250° C. in Ar—H$_2$ atmosphere. With this stripping the surface layers depleted of metallic chromium are pulverised over 0.5 á 5 µm for example, which reduces the sensitivity to corrosion after nitriding. Such treatment was applied before nitriding on machined pins in AISI 316L. The diffused depth reached during nitrocarburizing for 80 h at 400° C.+/−20° C. exceeds 20 µm. However it is preferable to avoid continuing stripping via radio-frequency plasma beyond 8 h since the surface could become too activated and could precipitate the nitrogen to CrN as soon as it arrives at the nitriding phase. For example the sensitivity to corrosion as measured by potentiostatic test reaches 3E-08 C/cm$^2$ for a stripping time of 2 h, and more than 10 C/cm$^2$ beyond a stripping time of 8 h.

A fourth treatment is tribo-finishing which successively uses increasingly finer abrasives. The removed depth, without causing heating and therefore no surface tensile stresses, and without perturbing the underlying layers can reach 10 µm in a few hours, in general in less than 3 hours which is sufficient to remove the thickness most perturbed during machining. Sensitivity to corrosion is therefore not affected by subsequent hardening treatment. Tribo-finishing can be implemented by vibrating abrasives in contact with the parts, the parts and abrasives being placed in a vibrating enclosure.

The treatments to remove work hardness of the surface layers are preferably used for parts whose shaping involves the removal of material carrying the risk of localised temporary heating and the creation of surface tensile stresses e.g. through machining.

For parts obtained by shaping without removal of material e.g. claddings it is preferable to use finishing treatments which allow the prevented onset of work hardening and in particular of surface tensile stresses on the outer surface.

More generally, the characteristics described above may be used independently of one another and may only be applied for example to some rods 13 of a control cluster 3.

It is therefore possible for example to use low carbon content independently of hyper quenching and independently of the non-application of finishing steps.

Similarly, it is possible to apply some of the above characteristics to welded tubular blanks.

The invention claimed is:

1. A method for manufacturing a cladding resistant to wear and corrosion for nuclear reactor, comprising:
   providing a tubular blank in austenitic stainless steel whose carbon content is equal to or lower than 0.03% by weight;
   shaping the blank;
   finishing the blank to form the cladding; and
   hardening an outer surface of the cladding by diffusing one or more atomic species; the blank, before the providing step or during the shaping or finishing step, being subjected to at least one hyper quenching with sub-steps of:
      heating the blank to a sufficient temperature and for a sufficient time to solubilise any precipitates present; and
      quenching the blank from the quench start temperature down to lower then 850° C. in less than 3 min allowing the austenitic structure to be maintained in a metastable state at ambient temperature and free of precipitates.

2. The method as recited in claim 1 wherein the heating sub-step is conducted at a temperature between 1020° C. and 1100° C.

3. The method as recited in claim 2 wherein the heating sub-step is conducted at a temperature between 1040 and 1080° C.

4. The method as recited in claim 1 wherein the heating sub-step is conducted for a time of between 1 minute 30 seconds and 30 minutes.

5. The method as recited in claim 4 wherein the heating sub-step is conducted for a time of between 3 and 10 minutes.

6. The method as recited in claim 1 wherein during the quench sub-step the blank is cooled from the quench start temperature down to lower than 450° C. in less than one quarter of an hour.

7. The method as recited in claim 1 wherein the hyper quenching is not followed during the shaping step or during the finishing step by an operation creating surface tensile stresses.

8. The method as recited in claim 1 wherein the hyper quenching is not followed during the shaping step or during the finishing step by grinding, brushing, polishing or buffing.

9. The method as recited in claim 1 wherein the finishing step comprises at least one stripping or tribo-finishing of the outer surface of the cladding.

10. The method as recited in claim 1 wherein the hardening step of the outer surface of the cladding comprises plasma nitriding.

11. The method as recited in claim 10 wherein the hardening step of the outer surface of the cladding comprises carbonitriding or nitrocarburizing.

12. The method as recited in claim 1 wherein the hardening step comprises carburizing or case hardening.

13. The method as recited in claim 1 wherein the blank is not welded.

14. A cladding in austenitic stainless steel obtained by the method as recited in claim 1.

15. A control cluster for pressurized water nuclear reactor comprising: a spider structure and absorber rods carried by the spider, the absorber rods comprising claddings containing at least one neutron-absorbing material and end plugs closing the claddings, wherein the claddings of at least some of the absorber rods are the cladding as recited in claim 14.

* * * * *